(12) United States Patent
Han et al.

(10) Patent No.: US 7,834,079 B2
(45) Date of Patent: Nov. 16, 2010

(54) WATER-SOLUBLE ANIONIC POLYMER DISPERSION AND METHOD FOR PRODUCING THE SAME

(75) Inventors: Sung Wook Han, Pyeong Taek (KR); Seung Chul Lee, Pyeong Taek (KR)

(73) Assignees: Green Technology, Inc., Pyungtaek-si (KR); Taki Chemical Co., Ltd., Kakogawa-shi (JP)

( * ) Notice: Subject to any disclaimer, the term of this patent is extended or adjusted under 35 U.S.C. 154(b) by 0 days.

(21) Appl. No.: 11/638,541

(22) Filed: Dec. 14, 2006

(65) Prior Publication Data

US 2007/0142519 A1 Jun. 21, 2007

(51) Int. Cl.
*C08F 2/16* (2006.01)
*C08L 33/02* (2006.01)
*C08L 33/26* (2006.01)

(52) U.S. Cl. ......................... 524/460; 524/458; 524/556
(58) Field of Classification Search ................. 524/458, 524/460, 556
See application file for complete search history.

(56) References Cited

U.S. PATENT DOCUMENTS

| 4,380,600 A * | 4/1983 | Hosoda et al. ............... 524/458 |
| 4,673,704 A * | 6/1987 | Flesher et al. ............... 524/519 |
| 2007/0060488 A9 * | 3/2007 | Samain et al. .............. 510/119 |

* cited by examiner

*Primary Examiner*—Helen L. Pezzuto
(74) *Attorney, Agent, or Firm*—Birch, Stewart, Kolasch & Birch, LLP

(57) ABSTRACT

Disclose is a water soluble anionic polymer dispersion containing a radical copolymer created in water salt which includes anionic monomer, non-ionic monomer, ionic dispersant and radical polymerization initiator, and anionic surfactant or non-ionic surfactant. Also disclosed is a water soluble anionic polymer dispersion is characterized by containment of radical copolymer created in salt water which includes anionic monomer, non-ionic monomer, ionic dispersant, and radical polymerization initiator, and anionic surfactant, and non-ionic surfactant. Manufacturing methods for the water soluble anionic polymer dispersions are further disclosed herein.

14 Claims, No Drawings

WATER-SOLUBLE ANIONIC POLYMER DISPERSION AND METHOD FOR PRODUCING THE SAME

DETAILED INSTRUCTION

The Field of Technology and its Conventional Technology the Invention Belongs To This invention refers to water—soluble anionic polymer dispersion and its manufacturing process. To be more specific, it is about the manufacturing process of water—soluble anionic polymer dispersion which has high—concentration, high-fluidity, and high-molecular weight with a low viscosity of reactant.

From the initial technical development till now, the water-soluble polymer has been researched mainly focused on convenient treatment and application with superior efficiency while it accommodated the demand of environmental friendly request at the same time.

Of water-soluble polymer anionic polymer is solely used for treatment of drinking water, sewage disposal, industrial waste water disposal, flowing water separation process, soil improvement, and rapid separation process of solid and liquid in many industries. It can also be used as paper-making retention aids, oil field chemical, or sometimes used side by side with positive ion.

But powder form of water-soluble polymer is difficult to dissolve and it is unsanitary since it blows harmful dusts while processing. It might cause a loss due to incomplete dissolution. Also, incompletely dissolved substance may produce serious side effects while doing separation process of solid and liquid.

The oil-free water soluble polymer dispersion is environmental friendly, does not show layer separation from long time storage compare to emulsion polymer, reduces contamination of separation processing facilities. When the oil-free water soluble polymer dispersion is used, the purity of separated remainder is superior and will enhance the recycle rate of disposed water.

From Can. J. Chem., 1984, Kar P. Lok and Christopher K. Ober commenced that when dispersing polymerization was performed in existence of graft copolymer dispersant which acts as stereo specific stabilizer, the number of particle is determined by the growing nucleus. And, the final dimension and distribution is determined mainly by the amount of monomer and role of stabilizer which preserves the colloid stability of growing particles.

Typically, dispersing polymerization progresses while controlling the polymerization and salting out speed in salt solution. In case of polymerization speed is faster than the salting out speed, it becomes difficult to control the reaction temperature of heat exchange due to increase of the reactant viscosity of reactant and intensive heat generation which will produce either a graft polymer or a product with unequal distribution of molecular weight. On the other hand, when the salting out speed of a polymer is faster than the polymerization while dispersing polymerization, it may generate a separation of polymer particle and the salt solution caused by difference of copolymerization speed.

Especially, dispersing polymerization of water soluble anionic polymer shows higher heat generation with faster polymerization speed than dispersing polymerization of cationic polymer. There are some technologies commenced such as lowering the reacting temperature or making reaction with a small dose of initiator while limiting the initiator with redox initiator since the viscosity of reactant intensely increases while reaction progress(JP 2002-302521). But it is still difficult to manufacture a product with stability in high concentration and fluidity because of difficulties in controlling reaction.

Many technologies have been commenced related to water soluble anionic polymer dispersing polymerization. JP 50-70489(1975) has been commenced a manufacturing process of using acrylic acid or its salt, 2-acrlyl amide propane sulfon acid or its salt, 2-acril amide-2-methyl propane sulfon acid or its salt as anionic monomer while manufacturing under 20 mol % of anionic water-soluble acryl amide polymer from ammonium sulfate aqueous solution. Besides, manufacturing process of water-soluble anionic polymer dispersion within a polymerization ph range of 2-5 was commenced in WO9734933(1997). Furthermore, manufacturing process of water-soluble anionic polymer dispersion under pH 4.5 was commenced in JP 10-21230(1997); manufacturing process of anionic water-soluble polymer dispersion under coexistence of cationic water-soluble polymer was commenced in JP 10-212320(1998); manufacturing process of polymer dispersion under coexistence of cationic surfactant, the dispersion aid, was commenced in JP 11-071583(1999).

And, the manufacturing process of anionic or non-ionic polymer dispersion of 0-7 mol % ion concentration at reaction environment of pH5 or above was commenced in U.S. Pat. No. 6,265,477 (2001); manufacturing process of water-soluble anionic polymer dispersion using metacrylic acid was commenced in U.S. Pat. No. 5,985,992 (2001); and released manufacturing process of anionic polymer dispersion using more than one cationic organic salt in WO9814483 (2002).

The manufacturing process of anionic water soluble polymer dispersion using redox series initiator by 5-50 ppm was commenced in JP2002-302521; manufacturing process of anionic water-soluble polymer dispersion of 0-30 mol % using acrylic acid and AMPS copolymer was commenced in U.S. Pat. No. 6,432,271 (2002); manufacturing process of anionic water-soluble polymer dispersion using polymer copolymer as polymer dispersion aid was commenced in U.S. Pat. No. 6,217,778(2004).

But, the manufacturing process of highly concentrated water soluble anionic polymer dispersion which does not contain oil has drawbacks; the viscosity of reactant rapidly raises while manufacturing due to quick polymerization speed and high heat generation; the low effective concentration of final product; weak point of losing product efficiency and stability due to extensive molecular weight distribution of polymer.

Technical Solution to be Accomplished by the Invention

While working on problem of difficulty on heat exchange which caused by rapidly increasing viscosity of reactant by controlling polymerization speed and heat generation, the inventors of this invention confirmed; in case of using adequate non-ionic surfactant, it is possible to accelerate the formation of nucleus while controlling the polymerization speed; when adequate anionic surfactant is used, it is possible to accelerate the salting out speed or raised the electric stability of created particle to obtain high-fluidity polymer dispersion with small, uniform particles.

Consequently, the main purpose of this invention is to provide stable, oil-free water soluble anionic polymer dispersion in high-concentration, high-fluidity, high-molecular weight and its manufacturing process by using non-ionic surfactant.

Another purpose of this invention is to provide stable, oil free water soluble anionic polymer dispersion in high-concentration, high-fluidity, high-molecular weight and its manufacturing process by using anionic surfactant.

Another purpose of this invention is to provide stable, oil free water soluble anionic polymer dispersion in high-concentration, high-fluidity, high-molecular weight and its manufacturing process by using non-ionic surfactant as well as anionic surfactant.

Especially, the purpose of this invention is to provide manufacturing process of highly-concentrated water soluble anionic polymer dispersion which may restrain the increase in viscosity of reactant while polymerization by using non-ionic surfactant and/or anionic surfactant when copolymerizing water soluble anionic monomer and non-ionic monomer in salt water with existence of anionic polymer dispersion agent.

Especially, the purpose of this invention is to provide manufacturing process of highly-concentrated water soluble anionic polymer dispersion which may control the speed of nucleus formation and reacting speed of polymerization by using anionic surfactant and/or non-ionic surfactant when copolymerizing water soluble anionic monomer and non-ionic monomer in salt water.

Especially, the purpose of this invention is to provide high-fluidity, highly-concentrated, high-efficiency water soluble anionic polymer dispersion under pH 5-8.5, 15-300 cps in viscosity.

Also, another purpose of this invention is to provide water soluble anionic polymer dispersion with 5-35 weight % of active content, 5 million-20 million molecular weight, and average particle size of 1-50 um.

The Structure of Invention

Typically, highly concentrated oil-free water soluble anionic polymer dispersion manufactured as above has difficulty in heat exchange since the viscosity of reactant rapidly raises while manufacturing due to quick polymerization speed and high heat generation. For this reason, there has been a research on high-fluidity, highly-concentrated, high-molecular weight water soluble anionic polymer dispersion which limits the viscosity increment of reactant and its manufacturing process; to solve the issue of losing product efficiency and stability due to extensive molecular weight distribution of polymer.

From that process, the inventors became to provide manufacturing process of highly concentrated water soluble anionic polymer dispersion which may restrain the increase in viscosity of reactant while polymerization by using non-ionic surfactant and/or anionic surfactant when copolymerizing water soluble anionic monomer and non-ionic monomer in salt water with existence of anionic polymer dispersion agent.

To provide stable oil-free water soluble anionic polymer dispersion in high-concentration, high-fluidity, high-molecular weight and its manufacturing process by using the characteristics of non-ionic surfactant, which may accelerate the formation of nucleus while controlling the polymerization speed, and characteristics of anionic surfactant, which may produce high fluidity polymer dispersion with small, uniform particles To accomplish the purpose of this invention as explained, it offers water soluble anionic polymer dispersion distinguished by containing radical copolymer which created with salt water inclusive of anionic monomer, non-ionic monomer, ionic dispersant, and radical polymerization initiator and anionic surfactant or non-ionic surfactant.

Also, this invention offers water soluble anionic polymer dispersion distinguished by containing radical copolymer which created with salt water inclusive of anionic monomer, non-ionic monomer, ionic dispersant and radical polymerization initiator and anionic surfactant and non-ionic surfactant.

Also, this invention offers manufacturing process of water soluble anionic polymer dispersion distinguished by radical copolymerization of anionic monomer and non-ionic monomer by using ionic dispersant, and radical polymerization initiator and anionic surfactant or non-ionic surfactant.

Also, this invention offers manufacturing process of water soluble anionic polymer dispersion distinguished by radical copolymerization of anionic monomer and non-ionic monomer by using ionic dispersant and radical polymerization initiator and anionic surfactant and non-ionic surfactant.

This invention is explained in detail with examples of experiment as follows. The examples of experiment are just to indicate the invention; the scope of invention is not limited to these examples.

"Dispersing polymerization" is a method of polymerization by using the difference in solubility of monomer and polymer in salt water; by polymerizing the dissolving monomer and extract it to become insoluble in salt water. It is also a method to achieve a final product by motivating electric stability and stability of specific gravity on the polymer particle created.

Once dispersing polymerization has began, the initial radical reacts with water soluble polymer dispersant and highly reactive monomer; which will create graft (co)polymer; as the reaction progresses, it grows and created as a nucleus.

At the moment, the state of created nucleus, such as the quantity or the rate of its formation is the key factor that determines the future progress of dispersing polymerization. In other words, when there is a quick formation of nucleus, the viscosity increasement during reaction becomes minimized even at a little rapid polymerization speed due to enough salting out speed; when there is a slow formation of nucleus, the viscosity of reactant rapidly increases due to fast polymerization speed which slows salting out.

It is very important to control the polymerization speed of reactant in dispersing polymerization because when polymerization speed of reacting monomer is too rapid, it is difficult to make heat exchange of reactant due to the formation of nucleus and salting out will progress at the same time; which lowers the stability of salted out particle and sometimes, continuous polymerization is difficult to happen.

When polymerization speed of reactant is too slow, the formation of nucleus and salting out also becomes slow; which lengthens the reacting time and makes difficult to obtain a product with stable, uniform particle.

The water soluble anionic polymer dispersion by experiment examples of this invention includes radical copolymer created in salt water inclusive of anionic monomer, non-ionic monomer, ionic dispersant, and radical polymerization initiator and anionic surfactant or non-ionic surfactant.

Also, the water soluble anionic polymer dispersion by other experiment examples of this invention includes radical copolymer created in salt water inclusive of anionic monomer, non-ionic monomer, ionic dispersant, and radical polymerization initiator and anionic surfactant, and non-ionic surfactant.

The water soluble anionic polymer dispersion of above example of experiment is manufactured by adding anionic surfactant and/or non-ionic surfactant; there is almost no increasement of viscosity during reaction since the speed of nucleus formation and the reaction speed of polymerization is under control.

The manufacturing process of water soluble anionic polymer dispersion followed by example of experiment on this invention is distinguished by; using more than one anionic monomer and more than one non-ionic monomer in copolymerization process by using radical polymerization initiator; using more than one ionic dispersant while using more than one anionic surfactant and/or more than one non-ionic surfactant which does not dissolve well in salt water.

The water soluble anionic polymer dispersion produced during experiment of this invention has viscosity of 15-300 CPS and is distinguished by high fluidity and high efficiency.

Also, the water soluble anionic polymer dispersion produced during experiment of this invention has a feature of pH5-8.2, 5-35% of active content, 5 million-20 million molecular weight.

For the anionic monomer written above, it is desirable to select and use more than one from a group composed of (meta)acrylic acid, 2-acryl amide 2-metyl 1-propane sulfonic acid, itaconic acid, maleic acid, fumaric acid, vinyl sulfonic acid, stylenesulfonic acid, or its salt.

In this invention, anionic monomer written above was applied for reaction after being solely neutralized; considering that neutralization of anionic monomer improves the hydrophile property to influence separation of solid liquid, such as cohesion.

On the contrary of this technology, Japan Patent JP 2004-352761 has commenced a method of neutralizing anionic and non-ionic monomer into alkali substance just before polymerization reacting occurs; in state of all ingredients, such as anionic monomer, non-ionic monomer, and polymer dispersant, are packed in order to produce high neutralization anionic water soluble polymer dispersion.

But JP 2004-352761 method, which offers neutralization to alkali substance in state of all ingredients being packed, has a possibility of various ingredients will act as a contaminant during polymerization process. Besides, it is difficult to obtain aimed reaction due to physical property of other secondary ingredients may be changed by polymerization time or temperature of polymerization reaction.

At this moment, it is desirable to add 1-80 mol % of anionic monomer written above over total monomer, considering the possibility of commercial usage.

For non-ionic monomer written above, it is desirable to select and use more than one from a group composed of (meta)acrylic acid, 2-acrylamide 2-metyl 1-propane sulfonic acid, itaconic acid, maleic acid, fumaric acid, vinyl sulfonic acid, styrenesulfonic acid, or its salt.

At this moment, it is desirable to add 20-99 mol % of nonionic monomer over total monomer, considering the possibility of commercial usage.

For dispersant written above, it is desirable to select and use more than one from a group composed of a homo polymer or a copolymer of acrylic acid, sodium acrylate, methacrylic acid, sodium methacrylate, 2-acryl amide 2-methylpropane sulfonic acid.

At this moment, it is desirable to use ionic dispersant with a (co)polymer that has viscosity rate of 100~20,000 CPS range.

By adding to anionic monomer or non-ionic monomer written above, the water soluble anionic polymer dispersion with high fluidity may be manufactured by using 0-35 mol % of both; cationic monomer that can be copolymerized and the whole monomer combined with anionic monomer and non-ionic monomer written above. If more than 35 mol % of cationic monomer becomes copolymerized at the moment, stable polymer dispersant cannot be manufactured due to loss of reactant's fluidity.

For polymerizing reaction written above it is desirable to select and use salt of more than one from a group composed of poly anionic salt such as ammonium sulfate, sodium sulfate, ammonium chloride, sodium chloride.

At this moment, it is desirable to use 15-40% of salt written above based on polymer dispersant because the viscosity rate will increase rapidly during reaction if less than 15% of anionic salt has applied; the reactant loses its fluidity and clusters of polymer particles develop if more than 40% has applied.

The anionic surfactant is being used as an aid for nucleus formation which is desirable to select and use more than one from a group composed of polycarboxylic acid or its salt, carboxymethyl cellulose sodium salt, carboxymethyl cellulose ammonium salt, sodium alginate; soluble in salt water. Especially, it is recommended to use polymer surfactant in polycarbon form of 2,000~10,000 molecular weight. At this moment, it is desirable to add 0.1-10 parts by weight of anionic surfactant written above per 100 parts by weight of monomer (includes both anionic monomer and non-ionic monomer). It is undesirable to add 10 or more parts by weight since it will raise the manufacturing cost.

The non-ionic surfactant is being used as an aid for nucleus formation which is desirable to select and use more than one from a group composed of polyoxyethyleneglycolether, polyoxyethylene, polyoxyprophylene glycolether, polyoxyethylenealkylphenylether, polyoxyethylenealkylether, naphthy polyoxyethyleneether, polyoxyethylenelanolinalcoholether; does not dissolve well in salt water. It is recommended to use polymer surfactant in polycarbon form of 2,000~10,000 molecular weight. At this moment, it is desirable to add 0.1-10 parts by weight of nonnionic surfactant written above per 100 parts by weight of monomer. It is undesirable to add 5 or more parts by weight since it will raise the manufacturing cost.

The composition of polymerizing monomer is related to temperature of polymerization as well as the types of polymerization initiator added; it its desirable to use redox series or water-soluble azobis series in 20-45 degree(desirable) or 25-35 degree(more desirable).

For redox series radical polymerization initiator written above, it is desirable to select and use more than one from a group composed of potassium persulfate, sodium persulfate, hydrogen peroxide, sodium sulfite, sodium hydrogensulfite, sodium thiosulfate, triethanolamine, N,N,N',N'-tetramethylethylenediamine, Especially, it is recommended to use potassium persulfate as a redox series reducing initiator.

The redox series radical polymerization initiator is sufficient to use oxidant initiator or reducing initiator alone; it is desirable on the aspect of progress management, such as simplified manufacturing process.

It is desirable to select and use more than one from a group composed of 2,2-azovis[2-(5-methyl-2-imidazorine-2-yle)2 hydride chloride, 2,2'-azovis(2-amidinoprophane) dihydrochloride, 4,4-azovis(4-methoxy-2,4-dimethyl) valeronitrile. Especially, it is desirable to use 2,2-azovis[2-(5-methyl-2-imidazorine-2-yle)2 hydride chloride.

It is desirable to add 50-2,000 ppm of polymerization initiator written above over total gross weight of monomer. Especially, 50-500 ppm adding quantity of polymerization initiator written above is desirable; the total reacting tine is lengthened due to low reaction speed when under 50 ppm of polymerization initiator written above is added; it is difficult to control heat generation due to excessively fast reaction time when more than 500 ppm is used.

Also, it is desirable to dispose remaining monomer by inputting excessive initiator. At the moment, it is desirable to add approximately 500-2,000 ppm of initiator over total weight of monomer written above.

EXAMPLE 1

Add 50% acrylamide aqueous solution 278.739 g, 99% acrylic acid 10.738 g, 15% poly-2-acrylamido-2-methyl propane sulfonic acid(p-AMPS) 30.0 g, Cellogen 5A (Daiichi kogyo seiyaku) 4.5 g, Noigen Ea-141(Daiichi kogyo seiyaku) 2.25 g, glycerin 7.5 g, ammonium sulfate 232.613 g, deionized water 385.773 g into a 1L reactor that is equipped with agitator, temperature sensor. nitrogen inlet line, condenser and that can be automatically controlled its precise reaction temperature of reactants. While agitating purge nitrogen during 20 minutes and set reaction temperature at 30° C.

The polymerization reaction was initiated by adding 1.5 g of 2% potassium persulfate aqueous solution as polymerization initiator; After 4 hours same amount of 2% potassium persulfate aqueous solution was added. And after 12 hours when its polymerization reaction was completed, 47.887 g of ammonium sulfate was added.

The water soluble anionic polymer dispersion manufactured as written above has 15% of active content, 7 mol % of anionic density, 5 μm of average particle size, 517 cps of product viscosity.

the particle size written above was measured with a microscope (Olympus, product name VANOX A112-FL), and product viscosity was measured with Brookfield viscometer (LVF type, measurement condition was Spindle No. 1, rpm 30(factor=2)).

EXAMPLE 2

Add 50% acrylamide aqueous solution 246.25 g, 99% acrylic acid 7.002 g, 99% 2-acrylamido-2-methyl propane sulfonic acid(AMPS) 20.145 g, 15% poly-acrylic acid 50.0 g, Cellogen NB-P(Daiichi kogyo seiyaku) 3.75 g, Noigen ET-135(Daiichi Icogyo seiyaku) 3.0 g, glycerin 4.5 g, ammonium sulfate 241.858 g, deionized water 393.354 g into the reactor same as example 1, while agitating purge nitrogen during 20 minutes and set temperature of reactor at 30° C.

The polymerization reaction was initiated by adding 1.5 g of 2% potassium persulfate aqueous solution as polymerization initiator; After 4 hours same amount of 2% potassium persulfate aqueous solution was added. And after 8 hours when its polymerization reaction was completed, 30.142 g of ammonium sulfate was added.

The water soluble anionic polymer dispersion manufactured as written above has 15% of active content, 10 mol % of anionic density, 4 μm of average particle size, 182 cps of product viscosity.

EXAMPLE 3

Add 50% acrylamide aqueous solution 230.476 g, 34% sodium acrylate 52.766 g, 99% 2-acrylamido-2-methyl propane sulfonic acid(AMPS) 11.978 g, 99% itaconic acid 5.013 g, 15% poly-sodium acrylate 45.0 g, sodium alginate(Waco Pure Chemical) 2.175 g, Noigen ET-89(Daiichi kogyo seiyaku) 2.7 g, glycerin 4.5 g, ammonium sulfate 247.714 g, deionized water 373.392 g into the reactor same as Example 1, While agitating purge nitrogen during 20 minutes and set temperature of reactor at 25° C.

The polymerization reaction was initiated by adding 1.5 g of 2% sodium bisulfite aqueous solution as polymerization initiator; After 4 hours same amount of 2% sodium bisulfite aqueous solution was added. And after another 4 hours same amount of 2% sodium bisulfite aqueous solution was added. And after 8 hours when its polymerization was completed 24.286 g of sodium sulfate was added.

The water soluble anionic polymer dispersion manufactured as written above has 15% of active content, 15 mol % of anionic density, 3 μm of average particle size, 125 cps of product viscosity.

EXAMPLE 4

Add 50% acrylamide aqueous solution 215.087 g, 99% acrylic acid 4.027 g, 34% sodium acrylate 35.731 g, 99% 2-acrylamido-2-methyl propane sulfonic acid(AMPS) 19.312 g, 99% itaconic acid 7.274 g, 15% poly 2-acrylamido 2-mehyl 1-propane sulfonic acid(p-AMPS) 45.0 g. CA-100 (Miyoshi) 10.0 g, Ramigen ET-20(Daiichi kogyo seiyaku) 2.85 g, glycerin 6.0 g, ammonium sulfate 226.431 g, deionized water 386.968 g into the reactor same as Example 1, While agitating purge nitrogen during 20 minutes and set temperature of reactor at 25° C.

The polymerization reaction was initiated by adding 1.5 g of 2% sodium bisulfite aqueous solution as polymerization initiator; And after 4 hours same amount of 2% sodium bisulfite aqueous solution was added. And after 12 hours when its polymerization was completed, 41.319 g of sodium sulfate was added.

The water soluble anionic polymer dispersion manufactured as written above has 15% of active content, 18 mol % of anionic density, 5 μm of average particle size, 139 cps of product viscosity.

EXAMPLE 5

Add 50% acrylamide aqueous solution 171.157 g, 99% 2-acrylamido-2-methyl propane sulfonic acid(AMPS) 54.930 g, 99% itaconic acid 10.142 g, 15% poly-sodium acrylate 48.0 g, POIZ 520(Kao Corporation) 3.0 g, Solsperse 20000(Avecia) 2.25 g glycerin 5.685, ammonium sulfate 220.068 g, deionized water 449.836 g into the reactor same as Example 1, while agitating purge nitrogen during 20 minutes and set temperature of reactor at 25° C.

The polymerization reaction was initiated by adding 1.5 g of 2% potassium persulfate aqueous solution as polymerization initiator; After 4 hours same amount of 2% potassium persulfate aqueous solution was added; And after another 4 hours same amount of 2% potassium persulfate aqueous solution was added. And after 8 hours when its polymerization was completed, 34.932 g of sodium sulfate was added.

The water soluble anionic polymer dispersion manufactured as written above has 15% of active content, 22 mol % of anionic density, 7 μm of average particle size, 78 cps of product viscosity.

EXAMPLE 6

Add 50% acrylamide aqueous solution 202.475 g, 34% sodium acrylate 99.819 g, 99% itaconic acid 14.974 g, 15% p-AMPS solution 70.0 g, POIZ 521(Kao Corporation) 9.75 g, Solsperse 24000(Avecia) 2.85 g, glycerin 7.2 g, ammonium sulfate 210.233 g, deionized water 326.032 g into the reactor same as Example 1, while agitating purge nitrogen during 20 minutes and set temperature of reactor at 35° C.

The polymerization reaction was initiated by adding 1.5 g of 2% VA-044 aqueous solution as polymerization initiator; After 6 hours same amount of 2% VA-044 aqueous solution was added. And after 12 hours when its polymerization was completed, 56.667 g of ammonium chloride was added.

The water soluble anionic polymer dispersion manufactured as written above has 15% of active content, 25 mol % of anionic density, 6 μm of average particle size, 86 cps of product viscosity.

EXAMPLE 7

Add 50% acrylamide aqueous solution 194.604 g, 99% acrylic acid 20.750 g, 99% itaconic acid 32.481 g, 15% poly-acrylic acid 45.0 g, POIZ 530(Kao Corporation) 3.75 g, Solsperse 27000(Avecia) 3.0 g, glycerin 4.5 g, ammonium sulfate 209.054 g, deionized water 427.070 g into the reactor same as Example 1, while agitating purge nitrogen during 20 minutes and set temperature of reactor at 25° C.

The polymerization reaction was initiated by adding 1.5 g of 2% sodium bisulfite aqueous solution as polymerization initiator; After 2 hours same amount of 2% sodium bisulfite aqueous solution was added; And after another 2 hours same amount of 2% sodium bisulfite aqueous solution was added. And after 12 hours when its polymerization was completed, 59.791 g of ammonium sulfate was added.

The water soluble anionic polymer dispersion manufactured as written above has 15% of active content, 28 mol % of anionic density, 9 μm of average particle size, 131 cps of product viscosity.

EXAMPLE 8

Add 50% acrylamide aqueous solution 161.561 g, 34% sodium acrylate 101.718 g, 99% 2-acrylamido 2-methyl 1-propane sulfonic acid(AMPS) 34.985 g, 15% poly-sodium acrylate 50.0 g, POIZ 532A(Kao Corporation) 7.5 g, Solsperse 43000(Avecia) 6.0 g, glycerin 3.0 g, ammonium sulfate 204.240 g, deionized water 381.936 g into the reactor same as Example 1, while agitating purge nitrogen during 20 minutes and set temperature of reactor at 25° C.

The polymerization reaction was initiated by adding 1.5 g of 2% potassium persulfate aqueous solution as polymerization initiator; After 4 hours same amount of 2% potassium persulfate aqueous solution was added. And after another 4 hours same amount of 2% potassium persulfate aqueous solution was added. And after 12 hours when its polymerization was completed, 49.060 g of ammonium sulfate was added.

The water soluble anionic polymer dispersion manufactured as written above has 15% of active content, 32 mol % of anionic density, 11 μm of average particle size, 153 cps of product viscosity.

EXAMPLE 9

Add 50% acrylamide aqueous solution 126.395 g, 99% acrylic acid 4.976 g, 99% 2-acrylamido 2-mehyl 1-propane sulfonic acid(AMPS) 77.311 g, 99% itaconic acid 5.393 g, 15% p-AMPS 60.0 g, CA-100(Miyoshi) 11.25 g, Solsperse 44000(Avecia) 4.5 g, glycerin 9.0 g, ammonium sulfate 223.110 g, deionized water 434.099 g into the reactor same as Example 1, while agitating purge nitrogen during 20 minutes and set temperature of reactor at 35° C.

The polymerization reaction was initiated by adding 1.5 g of 2% VA-044 aqueous solution as polymerization initiator; After 6 hours same amount of 2% VA-044 aqueous solution was added. And after 12 hours when its polymerization was completed, 43.967 g of ammonium sulfate was added.

The water soluble anionic polymer dispersion manufactured as written above has 15% of active content, 35 mol % of anionic density, 10 μm of average particle size, 79 cps of product viscosity.

EXAMPLE 10

Add 50% acrylamide aqueous solution 159.758 g, 99% acrylic acid 3.956 g, 34% sodium acrylate 125.360 g, 99% itaconic acid 23.820 g, 15% poly-acrylic acid 70.0 g, CA-100 (Miyoshi) 3.75 g, Emarujet 16(Daiichi kogyo seiyaku) 3.21 g, glycerin 7.5 g, ammonium sulfate 228.083 g, deionized water 334.440 g into the reactor same as Example 1, while agitating purge nitrogen during 20 minutes and set temperature of reactor at 35° C.

The polymerization reaction was initiated by adding 1.5 g of 2% VA-044 aqueous solution as polymerization initiator; After 6 hours same amount of 2% VA-044 aqueous solution was added. And after 12 hours when its polymerization was completed, 40.123 g of ammonium chloride was added.

The water soluble anionic polymer dispersion manufactured as written above has 15% of active content, 38 mol % of anionic density, 5 μm of average particle size, 94 cps of product viscosity.

EXAMPLE 11

Add 50% acrylamide aqueous solution 149.853 g, 34% sodium acrylate 186.032 g, 99% itaconic acid 11.942 g, 15% poly-sodium acrylate 60.0 g, Cellogen 5A((Daiichi kogyo seiyaku) 3.0 g, Ramigen ET-20 (Daiichi kogyo seiyaku) 3.0 g, ammonium sulfate 236.085 g, deionized water 318.227 g into the reactor same as Example 1, while agitating purge nitrogen during 20 minutes and set temperature of reactor at 35° C.

The polymerization reaction was initiated by adding 1.5 g of 2% sodium bisulfite aqueous solution as polymerization initiator; After 4 hours same amount of 2% sodium bisulfite aqueous solution was added. And after 12 hours when its polymerization was completed, 31.860 g of ammonium sulfate was added.

The water soluble anionic polymer dispersion manufactured as written above has 15% of active content, 42 mol % of anionic density, 7 μm of average particle size, 154 cps of product viscosity.

EXAMPLE 12

Add 50% acrylamide aqueous solution 106.218 g, 99% acrylic acid 4.942 g, 34% sodium acrylate 37.582 g, 99% 2-acrylamido 2-mehyl 1-propane sulfonic acid(AMPS) 71.094 g, 99% itaconic acid 8.926 g, 15% poly-sodium acrylate 50.0 g, Cellogen NB-P(Daiichi kogyo seiyaku) 4.5 g, Emarujet 16(Daiichi kogyo seiyaku) 2.1 g, ammonium sulfate 201.167 g, deionized water 458.889 g into the reactor same as Example 1, while agitating purge nitrogen during 20 minutes and set temperature of reactor at 35° C.

The polymerization reaction was initiated by adding 1.5 g of 2% sodium bisulfite aqueous solution as polymerization initiator; After 4 hours same amount of 2% sodium bisulfite aqueous solution was added. And after 12 hours when its polymerization was completed, 54.582 g of sodium sulfate was added.

The water soluble anionic polymer dispersion manufactured as written above has 15% of active content, 45 mol % of anionic density, 9 μm of average particle size, 112 cps of product viscosity.

EXAMPLE 13

Add 50% acrylamide aqueous solution 108.688 g, 34% sodium acrylate 109.822 g, 99% 2-acrylamido 2-mehyl 1-propane sulfonic acid(AMPS) 49.245 g, 99% itaconic acid 9.661 g, 15% poly-acrylic acid 65.0 g, sodium alginate(Waco Pure Chemical) 4.8 g, Noigen EA-141(Daiichi kogyo seiyaku) 3.0 g, ammonium sulfate 215.027 g, deionized water 411.581 g into the reactor same as Example 1, while agitating purge nitrogen during 20 minutes and set temperature of reactor at 35° C.

The polymerization reaction was initiated by adding 1.5 g of 2% ammonium persulfate aqueous solution as polymerization initiator. After 4 hours same amount of 2% ammonium persulfate aqueous solution was added. And after 12 hours when its polymerization was completed, 23.176 g of ammonium sulfate was added.

The water soluble anionic polymer dispersion manufactured as written above has 15% of active content, 48 mol % of anionic density, 8 μm of average particle size, 177 cps of product viscosity.

EXAMPLE 14

Add 50% acrylamide aqueous solution 79.710 g, 99% 2-acrylamido 2-mehyl 1-propane sulfonic acid(AMPS) 100.942 g, 99% itaconic acid 10.316 g, 15% poly-acrylic acid 75.0 g, POIZ 532A(Kao Corporation) 11.25 g, Noigen ET-135(Daiichi kogyo seiyaku) 2.25 g ammonium sulfate 190.579 g, deionized water 453.768 g into the reactor same as Example 1, while agitating purge nitrogen during 20 minutes and set temperature of reactor at 30° C.

The polymerization reaction was initiated by adding 1.5 g of 2% ammonium persulfate aqueous solution as polymerization initiator. After 4 hours same amount of 2% ammonium persulfate aqueous solution was added. And after 12 hours when its polymerization was completed, 76.185 g of ammonium sulfate was added.

The water soluble anionic polymer dispersion manufactured as written above has 15% of active content, 50 mol % of anionic density, 8 μm of average particle size, 96 cps of product viscosity.

EXAMPLE 15

Add 50% acrylamide aqueous solution 119.943 g, 99% acrylic acid 19.592 g, 34% sodium acrylate 139.054 g, 99% itaconic acid 23.591 g, 15% p-AMPS 70.0 g, POIZ 530(Kao Corporation) 7.5 g, Solsperse 44000(Avecia) 3.0 g, ammonium sulfate 177.727 g, deionized water 372.347 g into the reactor same as Example 1, while agitating purge nitrogen during 20 minutes and set temperature of reactor at 25° C.

The polymerization reaction was initiated by adding 1.5 g of 2% ammonium persulfate aqueous solution as polymerization initiator. After 4 hours same amount of 2% sodium bisulfite aqueous solution was added. And after 12 hours when its polymerization was completed, 67.247 g of ammonium sulfate was added.

The water soluble anionic polymer dispersion manufactured as written above has 15% of active content, 53 mol % of anionic density, 5 μm of average particle size, 81 cps of product viscosity.

EXAMPLE 16

Add 50% acrylamide aqueous solution 95.295 g, 34% sodium acrylate 164.841 g, 99% 2-acrylamido 2-mehyl 1-propane sulfonic acid(AMPS) 46.774 g, 15% poly-acrylic acid 50.0 g, POIZ 521(Kao Corporation) 9.0 g, Solsperse 27000(Avecia) 2.25 g ammonium sulfate 175.188 g, deionized water 368.340 g into the reactor same as Example 1, while agitating purge nitrogen during 20 minutes and set temperature of reactor at 35° C.

The polymerization reaction was initiated by adding 1.5 g of 2% VA-044 aqueous solution as polymerization initiator. After 6 hours same amount of 2% VA-044 aqueous solution was added. And after 12 hours when its polymerization was completed, 88.312 g of ammonium sulfate was added.

The water soluble anionic polymer dispersion manufactured as written above has 15% of active content, 55 mol % of anionic density, 8 μm of average particle size, 135 cps of product viscosity.

EXAMPLE 17

Add 50% acrylamide aqueous solution 85.967 g, 99% acrylic acid 13.618 g, 34% sodium acrylate 99.580 g, 99% 2-acrylamido 2-mehyl 1-propane sulfonic acid(AMPS) 60.280 g, 15% poly-sodium acrylate 60.0 g, POIZ 520(Kao Corporation) 15.0 g, Solsperse 24000(Avecia) 3.00 g, ammonium sulfate 170.218 g, deionized water 416.055 g into the reactor same as Example 1, while agitating purge nitrogen during 20 minutes and set temperature of reactor at 25° C.

The polymerization reaction was initiated by adding 1.5 g of 2% potassium persulfate aqueous solution as polymerization initiator. After 6 hours same amount of 2% potassium persulfate aqueous solution was added. And after 12 hours when its polymerization was completed, 76.282 g of ammonium sulfate was added.

The water soluble anionic polymer dispersion manufactured as written above has 15% of active content, 58 mol % of anionic density, 6 μm of average particle size, 119 cps of product viscosity.

EXAMPLE 18

Add 50% acrylamide aqueous solution 68.357 g, 99% acrylic acid 13.119 g, 99% 2-acrylamido 2-mehyl 1-propane sulfonic acid(AMPS) 88.075 g, 99% itaconic acid 15.797 g, 15% poly-acrylic acid 45.0 g, sodium alginate(Waco Pure Chemical) 4.5 g. Solsperse 43000(Avecia) 3.00 g, ammonium sulfate 172.649 g, deionized water 490.152 g into the reactor same as Example 1, while agitating purge nitrogen during 20 minutes and set temperature of reactor at 25° C.

The polymerization reaction was initiated by adding 1.5 g of 2% potassium persulfate aqueous solution as polymerization initiator. After 4 hours same amount of 2% potassium persulfate aqueous solution was added. And after 12 hours when its polymerization was completed, 99.351 g of ammonium sulfate was added.

The water soluble anionic polymer dispersion manufactured as written above has 15% of active content. 60 mol % of anionic density, 7 μm of average particle size, 144 cps of product viscosity.

EXAMPLE 19

Add 50% acrylamide aqueous solution 92.217 g, 34% sodium acrylate 305.563 g, 15% p-AMPS 50.0 g, Cellogen NB-P(Daiichi kogyo seiyaku) 18.75 g, Solsperse 44000(Avecia) 6.0 g, glycerin 7.5 g, ammonium sulfate 167.821 g, deionized water 264.970 g into the reactor same as Example 1, while agitating purge nitrogen during 20 minutes and set temperature of reactor at 25° C.

The polymerization reaction was initiated by adding 1.5 g of 2% ammonium persulfate aqueous solution as polymerization initiator. After 4 hours same amount of 2% ammonium persulfate aqueous solution was added. And after 12 hours when its polymerization was completed, 87.179 g of ammonium sulfate was added.

The water soluble anionic polymer dispersion manufactured as written above has 15% of active content, 63 mol % of anionic density, 10 μm of average particle size, 165 cps of product viscosity.

EXAMPLE 20

Add 50% acrylamide aqueous solution 46.768 g, 99% 2-acrylamido 2-mehyl 1-propane sulfonic acid(AMPS) 127.895 g, 15% poly-sodium acrylate 70.0 g, Cellogen 5A((Daiichi kogyo seiyaku) 4.5 g, Solsperse 20000(Avecia) 2.25 g glycerin 7.5 g, ammonium sulfate 172.649 g, deionized water 469.087 g into the reactor same as Example 1, while agitating purge nitrogen during 20 minutes and set temperature of reactor at 20° C.

The polymerization reaction was initiated by adding 1.5 g of 2% ammonium persulfate aqueous solution as polymerization initiator. After 4 hours same amount of 2% ammonium persulfate aqueous solution was added. And after 12 hours when its polymerization was completed, 99.351 g of ammonium sulfate was added.

The water soluble anionic polymer dispersion manufactured as written above has 15% of active content, 65 mol % of anionic density, 12 μm of average particle size, 179 cps of product viscosity.

EXAMPLE 21

Add 50% acrylamide aqueous solution 43.488 g, 99% acrylic acid 3.478 g, 99% 2-acrylamido 2-mehyl 1-propane sulfonic acid(AMPS) 126.074 g, 15% poly-sodium acrylate 60 g, POIZ 520(Kao Corporation) 15 g, Noigen EA-141 (Daiichikogyoseiyaku) 3.0 g, glycerin 9.0 g, ammonium sulfate 179.842 g, deionized water 459.460 g into the reactor same as Example 1, while agitating purge nitrogen during 20 minutes and set temperature of reactor at 20° C.

The polymerization reaction was initiated by adding 1.5 g of 2% sodium bisulfite aqueous solution as polymerization initiator. After 4 hour same amount of 2% sodium bisulfite aqueous solution was added. And after 12 hours when its polymerization was completed, 100.658 g of ammonium sulfate was added.

The water soluble anionic polymer dispersion manufactured as written above has 15% of active content, 68 mol % of anionic density, 15 μm of average particle size, 195 cps of product viscosity.

EXAMPLE 22

Add 50% acrylamide aqueous solution 63.218 g, 99% acrylic acid 5.778 g, 34% sodium acrylate 263.622 g, 99% 2-acrylamido 2-mehyl 1-propane sulfonic acid(AMPS) 23.272 g, 15% poly-sodium acrylate 43.0 g, POIZ 521(Kao Corporation) 13.875 g, Noigen EA-135(Daiichi kogyo seiyaku) 2.7 g, glycerin 7.5 g, ammonium sulfate 176.458 g, deionized water 317.785 g into the reactor same as Example 1, while agitating purge nitrogen during 20 minutes and set temperature of reactor at 20° C.

The polymerization reaction was initiated by adding 1.5 g of 2% potassium persulfate aqueous solution as polymerization initiator. After 4 hours same amount of 2% sodium bisulfite aqueous solution was added. And after 12 hours when its polymerization was completed, 82.792 g of sodium sulfate was added.

The water soluble anionic polymer dispersion manufactured as written above has 15% of active content, 72 mol % of anionic density, 11 μm of average particle size, 103 cps of product viscosity.

EXAMPLE 23

Add 50% acrylamide aqueous solution 53.372 g, 99% acrylic acid 4.371 g, 34% sodium acrylate 249.273 g, 99% 2-acrylamido 2-mehyl 1-propane sulfonic acid(AMPS) 34.580 g, 15% poly-acrylic acid 60.0 g, POIZ 530(Kao Corporation) 15.0 g, Noigen ET-89(Daiichi kogyo seiyaku) 3.0 g, glycerin 9.0 g, ammonium sulfate 220.068 g, deionized water 316.405 g into the reactor same as Example 1, while agitating purge nitrogen during 20 minutes and set temperature of reactor at 45° C.

The polymerization reaction was initiated by adding 1.5 g of 2% V-50 aqueous solution as polymerization initiator. After 4 hours same amount of 2% V-50 aqueous solution was added. And after 12 when its polymerization was completed, 34.932 g of ammonium chloride was added.

The water soluble anionic polymer dispersion manufactured as written above has 15% of active content, 75 mol % of anionic density, 15 μm of average particle size, 172 cps of product viscosity.

EXAMPLE 24

Add 50% acrylamide aqueous solution 42.891 g, 34% sodium acrylate 27.637 g, 99% 2-acrylamido 2-mehyl 1-propane sulfonic acid(AMPS) 51.675 g, 15% poly-sodium acrylate 50.0 g, POIZ 532A (Kao Corporation) 7.5 g, Ramigen ET-20(Daiichi kogyo seiyaku) 1.5 g, glycerin 7.5 g, ammonium sulfate 224.778 g, deionized water 339.297 g into the reactor same as Example 1, while agitating purge nitrogen during 20 minutes and set temperature of reactor at 45° C.

The polymerization reaction was initiated by adding 1.5 g of 2% V-50 aqueous solution as polymerization initiator. After 4 hours same amount of 2% V-50 aqueous solution was added. And after 12 hours when its polymerization was completed, 47.222 g of sodium sulfate was added.

The water soluble anionic polymer dispersion manufactured as written above has 15% of active content, 78 mol % of anionic density, 13 μm of average particle size, 180 cps of product viscosity.

EXAMPLE 25

Add 50% acrylamide aqueous solution 328.016 g, 99% 2-acrylamido 2-mehyl 1-propane sulfonic acid(AMPS) 36.356 g. 15% poly-acrylic acid 40.0 g, Cellogen 5A((Daiichi kogyo seiyaku) 6.0 g, Emarujet 16(Daiichi kogyo seiyaku) 4.29 g, glycerin 4.0 g, ammonium sulfate 166.789 g, sodium sulfate 5.0 g, deionized water 325.338 g into the reactor same as Example 1, while agitating purge nitrogen during 20 minutes and set temperature of reactor at 20° C.

The polymerization reaction was initiated by adding 1.5 g of 2% potassium persulfate aqueous solution as polymerization initiator. After 4 hours same amount of 2% potassium persulfate aqueous solution was added. And after 12 hours when its polymerization was completed, 84.211 g of ammonium sulfate was added.

The water soluble anionic polymer dispersion manufactured as written above has 20% of active content, 7 mol % of anionic density, 5 μm of average particle size, 65 cps of product viscosity.

EXAMPLE 26

Add 50% acrylamide aqueous solution 345.334 g, 34% sodium acrylate 59.736 g, 99% itaconic acid 7.094 g, 15% p-AMPS 53.333 g, Cellogen NB-P(Daiichi kogyo seiyaku) 2.0 g, Ramigen ET-20(Daiichi kogyo seiyaku) 2.0 g, glycerin 8.0 g, ammonium sulfate 199.164 g, ammonium chloride 5.0 g, deionized water 275.340 g into the reactor same as Example 1, while agitating purge nitrogen during 20 minutes and set temperature of reactor at 20° C.

The polymerization reaction was initiated by adding 1.5 g of 2% potassium persulfate aqueous solution as polymerization initiator. After 4 hours same amount of 2% potassium persulfate aqueous solution was added. And after 12 hours when its polymerization was completed, 42.999 g of ammonium sulfate was added.

The water soluble anionic polymer dispersion manufactured as written above has 20% of active content, 10 mol % of anionic density, 6 μm of average particle size, 72 cps of product viscosity.

EXAMPLE 27

Add 50% acrylamide aqueous solution 291.882 g, 99% acrylic acid 5.211 g, 99% 2-acrylamido 2-mehyl 1-propane sulfonic acid(AMPS) 39.982 g, 99% itaconic acid 9.412 g, 15% poly-acrylic acid 53.333 g, CA-100(Miyoshi) 10.0 g, Noigen ET-135(Daiichi kogyo seiyaku) 4.0 g, glycerin 10.0 g, ammonium sulfate 186.667 g, deionized water 336.180 g into the reactor same as Example 1, while agitating purge nitrogen during 20 minutes and set temperature of reactor at 20° C.

The polymerization reaction was initiated by adding 1.5 g of 2% ammonium sulfate aqueous solution as polymerization initiator. After 4 hours same amount of 2% ammonium sulfate aqueous solution was added. And after 12 hours when its polymerization was completed, 53.333 g of ammonium sulfate was added.

The water soluble anionic polymer dispersion manufactured as written above has 20% of active content, 14 mol % of anionic density, 5 μm of average particle size, 62 cps of product viscosity.

EXAMPLE 28

Add 50% acrylamide aqueous solution 276.659 g, 34% sodium acrylate 65.667 g, 99% 2-acrylamido 2-mehyl 1-propane sulfonic acid(AMPS) 39.745 g, 15% poly-sodium acrylate 53.333 g, POIZ 532A(Kao Corporation) 15.0 g, Solsperse 27000(Avecia) 4.0 g, glycerin 8.0 g, ammonium sulfate 196.757 g, deionized water 297.607 g into the reactor same as Example 1, while agitating purge nitrogen during 20 minutes and set temperature of reactor at 25° C.

The polymerization reaction was initiated by adding 1.5 g of 2% potassium persulfate aqueous solution as polymerization initiator. After 4 hours same amount of 2% potassium persulfate aqueous solution was added. And after 12 hours when its polymerization was completed, 43.232 g of ammonium sulfate was added.

The water soluble anionic polymer dispersion manufactured as written above has 20% of active content, 18 mol % of anionic density, 4 μm of average particle size, 57 cps of product viscosity.

EXAMPLE 29

Add 50% acrylamide aqueous solution 281.603 g, 99% acrylic acid 9.608 g, 34% sodium acrylate 146.135 g , 15% p-AMPS 73.333 g , POIZ 530(Kao Corporation) 7.5 g, Noigen EA-141 (Daiichi kogyo seiyaku) 3.0 g, glycerin 10.0 g, ammonium sulfate 201.205 g, deionized water 212.820 g into the reactor same as Example 1, while agitating purge nitrogen during 20 minutes and set temperature of reactor at 35° C.

The polymerization reaction was initiated by adding 1.5 g of 2% VA-044 aqueous solution as polymerization initiator. After 6 hours same amount of 2% VA-044 aqueous solution was added. And after 12 hours when its polymerization was completed, 54.795 g of ammonium sulfate was added.

The water soluble anionic polymer dispersion manufactured as written above has 20% of active content, 25 mol % of anionic density, 7 μm of average particle size, 84 cps of product viscosity.

EXAMPLE 30

Add 50% acrylamide aqueous solution 194.687 g. 99% acrylic acid 4.152 g, 99% 2-acrylamido 2-mehyl 1-propane sulfonic acid(AMPS) 99.542 g, 15% poly-sodium acrylate 62.667 g , POIZ 521(Kao Corporation) 12.5 g, Noigen ET-89 (Daiichi kogyo seiyaku) 2.0 g, glycerin 9.0 g, ammonium sulfate 180.424 g, deionized water 371.453 g into the reactor same as Example 1, while agitating purge nitrogen during 20 minutes and set temperature of reactor at 35° C.

The polymerization reaction was initiated by adding 1.5 g of 2% VA-044 aqueous solution as polymerization initiator. After 6 hours same amount of 2% VA-044 aqueous solution was added. And after 12 hours when its polymerization was completed. 63.576 g of ammonium sulfate was added.

The water soluble anionic polymer dispersion manufactured as written above has 20% of active content, 28 mol % of anionic density, 8 μm average particle size, 93 cps of product viscosity.

EXAMPLE 31

Add 50% acrylamide aqueous solution 246.498 g, 34% sodium acrylate 225.738 g, 15% poly-AMPS 66.667 g, POIZ 520(Kao Corporation) 20.0 g, Solsperse 43000(Avecia) 8.0 g, glycerin 10.0 g, ammonium sulfate 181.333 g, deionized water 167.097 g into the reactor same as Example 1, while agitating purge nitrogen during 20 minutes and set temperature of reactor at 45° C.

The polymerization reaction was initiated by adding 1.5 g of 2% V-50 aqueous solution as polymerization initiator. After 4 hours same amount of 2% V-50 aqueous solution was added. And after 12 hours when its polymerization was completed, 74.667 g of ammonium sulfate was added.

The water soluble anionic polymer dispersion manufactured as written above has 20% of active content, 32 mol % of anionic density, 6 μm of average particle size, 108 cps of product viscosity.

EXAMPLE 32

Add 50% acrylamide aqueous solution 213.444 g, 34% sodium acrylate 159.756 g, 99% 2-acrylamido 2-mehyl 1-propane sulfonic acid(AMPS) 24.177 g, 99% itaconic acid 15.178 g, 15% poly-acrylic acid 80.0 g, sodium alginate (Waco Pure Chemical) 7.0 g, Emarujet 16(Daiichi kogyo seiyaku) 3.6 g, glycerin 9.6 g, ammonium sulfate 160.014 g, deionized water 225.923 g into the reactor same as Example 1, while agitating purge nitrogen during 20 minutes and set temperature of reactor at 45° C.

The polymerization reaction was initiated by adding 1.5 g of 2% V-50 aqueous solution as polymerization initiator. After 4 hours same amount of 2% V-50 aqueous solution was added. And after 12 hours when its polymerization was completed, 101.308 g of sodium sulfate was added.

The water soluble anionic polymer dispersion manufactured as written above has 20% of active content, 35 mol % of anionic density, 9 μm of average particle size, 111 cps of product viscosity.

EXAMPLE 33

Add 50% acrylamide aqueous solution 179.205 g. 34% sodium acrylate 116.246 g, 99% 2-acrylamido 2-mehyl 1-propane sulfonic acid(AMPS) 43.980 g, 99% itaconic acid 27.610 g, 15% poly-AMPS 80.0 g, Cellogen 5A(Daiichi kogyo seiyaku) 8.0 g, Solsperse 44000(Avecia) 8.0 g, glycerin 10.0 g, ammonium sulfate 211.556 g, deionized water 271.661 g into the reactor same as Example 1, while agitating purge nitrogen during 20 minutes and set temperature of reactor at 20° C.

The polymerization reaction was initiated by adding 1.5 g of 2% potassium persulfate aqueous solution as polymerization initiator. After 4 hours same amount of 2% potassium persulfate aqueous solution was added. And after 12 hours when its polymerization was completed, 43.742 g of ammonium sulfate was added.

The water soluble anionic polymer dispersion manufactured as written above has 20% of active content, 40 mol % of anionic density, 11 μm of average particle size, 107 cps of product viscosity.

EXAMPLE 34

Add 50% acrylamide aqueous solution 196.816 g, 99% acrylic acid 26.508 g, 34% sodium acrylate 100.792 g, 99% itaconic acid 41.495 g, 15% poly-acrylic acid 80.0 g, Sodium Alginate(Waco Pure Chemical) 2.0 g, Solsperse 20000(Avecia) 2.0 g, ammonium sulfate 160.205 g, deionized water 326.765 g into the reactor same as Example 1, while agitating purge nitrogen during 20 minutes and set temperature of reactor at 20° C.

The polymerization reaction was initiated by adding 1.5 g of 2% ammonium persulfate aqueous solution as polymerization initiator. After 4 hours same amount of 2% ammonium persulfate aqueous solution was added. And after 12 hours when its polymerization was completed, 63.419 g of ammonium sulfate was added.

The water soluble anionic polymer dispersion manufactured as written above has 20% of active content, 43 mol % of anionic density, 11 μm of average particle size. 126 cps of product viscosity.

EXAMPLE 35

Add 50% acrylamide aqueous solution 194.939 g, 99% acrylic acid 54.420 g, 99% itaconic acid 49.146 g, 15% poly-sodium acrylate 80.0 g, POIZ 530(Kao Corporation) 15.0 g, Solsperse 24000(Avecia) 4.0 g, ammonium sulfate 157.758 g, deionized water 382.507 g into the reactor same as Example 1, while agitating purge nitrogen during 20 minutes and set temperature of reactor at 20° C.

The polymerization reaction was initiated by adding 1.5 g of 2% sodium bisulfite aqueous solution as polymerization initiator. After 4 hours same amount of 2% sodium bisulfite aqueous solution was added. And after 12 hours when its polymerization was completed, 62.230 g of ammonium sulfate was added.

The water soluble anionic polymer dispersion manufactured as written above has 20% of active content, 45 mol % of anionic density, 9 μm of average particle size, 135 cps of product viscosity.

EXAMPLE 36

Add 50% acrylamide aqueous solution 101.718 g, 99% 2-acrylamido 2-mehyl 1-propane sulfonic acid(AMPS) 131.058 g, 99% itaconic acid 19.589 g, 15% poly-sodium acrylate 64.0 g, CA-100(Miyoshi) 11.5 g, Solsperse 20000 (Avecia) 3.4 g, ammonium sulfate 179.368 g, deionized water 436.735 g into the reactor same as Example 1, while agitating purge nitrogen during 20 minutes and set temperature of reactor at 25° C.

The polymerization reaction was initiated by adding 1.5 g of 2% potassium persulfate aqueous solution as polymerization initiator. After 4 hours same amount of 2% potassium persulfate aqueous solution was added. And after 12 hours when its polymerization was completed, 52.632 g of ammonium chloride was added.

The water soluble anionic polymer dispersion manufactured as written above has 20% of active content, 52 mol % of anionic density, 5 μm of average particle size, 70 cps of product viscosity.

EXAMPLE 37

Add 50% acrylamide aqueous solution 159.307 g, 99% acrylic acid 72.474 g, 99% itaconic acid 49.088 g, 15% poly-AMPS 61.333 g, POIZ 532A(Kao Corporation) 14.5 g, Noigen EA-141 (Daiichi kogyo kogyo seiyaku) 3.6 g, ammonium sulfate 191.135 g, deionized water 388.762 g into the reactor same as Example 1, while agitating purge nitrogen during 20 minutes and set temperature of reactor at 25° C.

The polymerization reaction was initiated by adding 1.5 g of 2% ammonium persulfate aqueous solution as polymerization initiator. After 4 hours same amount of 2% ammonium persulfate aqueous solution was added. And after 12 hours when its polymerization was completed, 59.801 g of ammonium sulfate was added.

The water soluble anionic polymer dispersion manufactured as written above has 20% of active content, 55 mol % of anionic density, 13 μm of average particle size, 142 cps of product viscosity.

EXAMPLE 38

Add 50% acrylamide aqueous solution 118.238 g, 34% sodium acrylate 287.617 g, 99% 2-acrylamido 2-mehyl 1-propane sulfonic acid(AMPS) 43.527 g, 15% poly-AMPS 66.667 g, POIZ 521(Kao Corporation) 10.0 g, Solsperse 27000(Avecia) 4.0 g, ammonium sulfate 204.164 g, deionized water 221.952 g into the reactor same as Example 1, while agitating purge nitrogen during 20 minutes and set temperature of reactor at 25° C.

The polymerization reaction was initiated by adding 1.5 g of 2% sodium bisulfite aqueous solution as polymerization initiator. After 4 hours same amount of 2% sodium bisulfite aqueous solution was added. And after 12 hours when its polymerization was completed, 43.836 g of ammonium sulfate was added.

The water soluble anionic polymer dispersion manufactured as written above has 20% of active content, 60 mol % of anionic density, 11 μm of average particle size, 150 cps of product viscosity.

EXAMPLE 39

Add 50% acrylamide aqueous solution 75.375 g, 99% acrylic acid 5.076 g, 99% 2-acrylamido 2-mehyl 1-propane sulfonic acid(AMPS) 146.041 g, 99% itaconic acid 12.835 g, 15% poly-AMPS 93.333 g, sodium alginate(Waco Pure Chemical) 8.0 g, Ramigen ET-20(Daiichi kogyo seiyaku) 4.0 g, ammonium sulfate 176.842 g, deionized water 434.662 g into the reactor same as Example 1, while agitating purge nitrogen during 20 minutes and set temperature of reactor at 35° C.

The polymerization reaction was initiated by adding 1.5 g of 2% VA-044 aqueous solution as polymerization initiator. After 6 hours same amount of 2% VA-044 aqueous solution was added. And after 12 hours when its polymerization was completed, 43.836 g of ammonium sulfate was added.

The water soluble anionic polymer dispersion manufactured as written above has 20% of active content, 62 mol % of anionic density, 14 μm of average particle size, 143 cps of product viscosity.

EXAMPLE 40

Add 50% acrylamide aqueous solution 454.710 g, 34% sodium acrylate 66.604 g, 15% poly-acrylic acid 83.333 g, Cellogen 5A((Daiichi kogyo seiyaku) 5.0 g, Noigen ET-89 (Daiichi kogyo seiyaku) 5.0 g, glycerin 7.5 g, ammonium sulfate 195.417 g, deionized water 130.354 g into the reactor same as Example 1, while agitating purge nitrogen during 20 minutes and set temperature of reactor at 20° C.

The polymerization reaction was initiated by adding 1.5 g of 2% potassium persulfate aqueous solution as polymerization initiator. After 4 hours same amount of 2% potassium persulfate aqueous solution was added. And after 12 hours when its polymerization was completed, 52.083 g of ammonium sulfate was added.

The water soluble anionic polymer dispersion manufactured as written above has 25% of active content, 7 mol % of anionic density, 4 μm of average particle size, 124 cps of product viscosity.

EXAMPLE 41

Add 50% acrylamide aqueous solution 438.540 g, 99% acrylic acid 4.988 g, 34% sodium acrylate 75.859 g, 15% poly-sodium acrylate 83.333 g, POIZ 520(Kao Corporation) 3.125 g, Emarujet 16(Daiichi kogyo seiyaku) 1.25 g, glycerin 10.0 g, ammonium sulfate 203.287 g, deionized water 142.905 g into the reactor same as Example 1, while agitating purge nitrogen during 20 minutes and set temperature of reactor at 25° C.

The polymerization reaction was initiated by adding 1.5 g of 2% potassium persulfate aqueous solution as polymerization initiator. After 4 hours same amount of 2% potassium persulfate aqueous solution was added. And after 12 hours when its polymerization was completed, 36.713 g of ammonium sulfate was added.

The water soluble anionic polymer dispersion manufactured as written above has 25% of active content, 10 mol % of anionic density, 10 μm of average particle size, 135 cps of product viscosity.

EXAMPLE 42

Add 50% acrylamide aqueous solution 411.380 g, 34% sodium acrylate 130.323 g, 15% poly-AMPS 83.333 g, POIZ 530(Kao Corporation) 9.375 g, Noigen ET-135(Daiichi kogyo seiyaku) 3.75 g, glycerin 12.5 g, ammonium sulfate 165.789 g, deionized water 124.338 g into the reactor same as Example 1, while agitating purge nitrogen during 20 minutes and set temperature of reactor at 25° C.

The polymerization reaction was initiated by adding 1.5 g of 2% ammonium persulfate aqueous solution as polymerization initiator. After 4 hours same amount of 2% ammonium persulfate aqueous solution was added. And after 12 hours when its polymerization was completed, 59.211 g of ammonium sulfate was added.

The water soluble anionic polymer dispersion manufactured as written above has 25% of active content, 14 mol % of anionic density, 12 μm of average particle size, 106 cps of product viscosity.

EXAMPLE 43

Add 50% acrylamide aqueous solution 304.877 g, 99% 2-acrylamido 2-mehyl 1-propane sulfonic acid(AMPS) 98.547 g, 15% poly-sodium acrylate 100.0 g, Cellogen NB-P (Daiichi kogyo seiyaku) 5.0 g, Solsperse 20000(Avecia) 5.0 g, glycerin 12.5 g, ammonium sulfate 177.5 g, deionized water 256.576 g into the reactor same as Example 1, while agitating purge nitrogen during 20 minutes and set temperature of reactor at 25° C.

The polymerization reaction was initiated by adding 1.5 g of 2% sodium bisulfite aqueous solution as polymerization initiator. After 4 hours same amount of 2% sodium bisulfite aqueous solution was added. And after 12 hours when its polymerization was completed, 40.000 g of ammonium sulfate was added.

The water soluble anionic polymer dispersion manufactured as written above has 25% of active content, 18 mol % of anionic density, 5 μm of average particle size, 140 cps of product viscosity.

EXAMPLE 44

Add 50% acrylamide aqueous solution 263.745 g. 99% acrylic acid 5.399 g, 99% 2-acrylamido 2-mehyl 1-propane sulfonic acid(AMPS) 113.922 g, 15% poly-acrylic acid 90.0 g, Cellogen 5A (Daiichi kogyo seiyaku) 6.25 g, Solsperse 43000(Avecia) 4.0 g, glycerin 15 g, ammonium sulfate 148.077 g, deionized water 276.685 g into the reactor same as Example 1, while agitating purge nitrogen during 20 minutes and set temperature of reactor at 35° C.

The polymerization reaction was initiated by adding 1.5 g of 2% VA-044 aqueous solution as polymerization initiator. After 6 hours same amount of 2% VA-044 aqueous solution was added. And after 12 hours when its polymerization was completed. 76.923 g of ammonium sulfate was added.

The water soluble anionic polymer dispersion manufactured as written above has 25% of active content, 25 mol % of anionic density, 11 μm of average particle size, 119 cps of product viscosity.

EXAMPLE 45

Add 50% acrylamide aqueous solution 239.392 g, 99% acrylic acid 5.399 g, 99% 2-acrylamido 2-mehyl 1-propane sulfonic acid(AMPS) 122.399 g, 99% itaconic acid 9.221 g, 15% poly-sodium acrylate 83.333 g, POIZ 532A(Kao Corporation) 18.750 g, Solsperse 24000(Avecia) 5.0 g, glycerin 12.5 g, ammonium sulfate 149.153 g, deionized water 264.701 g into the reactor same as Example 1, while agitating purge nitrogen during 20 minutes and set temperature of reactor at 35° C.

The polymerization reaction was initiated by adding 1.5 g of 2% VA-044 aqueous solution as polymerization initiator. After 6 hours same amount of 2% VA-044 aqueous solution was added. And after 12 hours when its polymerization was completed, 95.55 g of ammonium sulfate was added.

The water soluble anionic polymer dispersion manufactured as written above has 25% of active content, 28 mol % of anionic density, 10 μm of average particle size, 104 cps of product viscosity.

EXAMPLE 46

Add 50% acrylamide aqueous solution 279.855 g. 34% sodium acrylate 200.222 g, 99% 2-acrylamido 2-mehyl 1-propane sulfonic acid(AMPS) 42.421 g, 15% poly-sodium acrylate 83.333 g, sodium alginate(Waco Pure Chemical) 5.0 g, Solsperse 44000(Avecia) 5.0 g. ammonium sulfate 157.938 g. deionized 162.918 g into the reactor same as Example 1, while agitating purge nitrogen during 20 minutes and set temperature of reactor at 45° C.

The polymerization reaction was initiated by adding 1.5 g of 2% V-50 aqueous solution as polymerization initiator. After 4 hours same amount of 2% V-50 aqueous solution was added. And after 12 hours when its polymerization was completed, 63.312 g of ammonium sulfate was added.

The water soluble anionic polymer dispersion manufactured as written above has 25% of active content, 32 mol % of anionic density, 9 μm of average particle size, 132 cps of product viscosity.

EXAMPLE 47

Add 50% acrylamide aqueous solution 265.544 g. 34% sodium acrylate 206.702 g, 99% 2-acrylamido 2-mehyl 1-propane sulfonic acid(AMPS) 36.094 g, 99% itaconic acid 11.329 g, 15% poly-AMPS 75.0 g, CA-100(Miyoshi) 21.875 g, Noigen ET-135(Daiichi kogyo seiyaku) 3.75 g, ammonium sulfate 149.135 g, deionized water 160.363 g into the reactor same as Example 1, while agitating purge nitrogen during 20 minutes and set temperature of reactor at 45° C.

The polymerization reaction was initiated by adding 1.5 g of 2% V-50 aqueous solution as polymerization initiator. After 4 hours same amount of 2% V-50 aqueous solution was added. And after 12 hours when its polymerization was completed, 70.208 g of ammonium sulfate was added.

The water soluble anionic polymer dispersion manufactured as written above has 25% of active content, 35 mol % of anionic density, 8 μm of average particle size, 107 cps of product viscosity.

EXAMPLE 48

Add 50% acrylamide aqueous solution 248.885 g, 34% sodium acrylate 201.807 g, 99% itaconic acid 57.518 g, 15% poly-AMPS 83.333 g, POIZ 521(Kao Corporation) 15.0 g, Solsperse 20000(Avecia) 4.5 g, ammonium sulfate 155.088 g, deionized water 219.701 g into the reactor same as Example 1, while agitating purge nitrogen during 20 minutes and set temperature of reactor at 20° C.

The polymerization reaction was initiated by adding 1.5 g of 2% potassium persulfate aqueous solution as polymerization initiator. After 4 hours same amount of 2% potassium persulfate aqueous solution was added. And after 12 hours when its polymerization was completed, 14.167 g of ammonium sulfate was added.

The water soluble anionic polymer dispersion manufactured as written above has 25% of active content, 40 mol % of anionic density, 16 μm of average particle size, 149 cps of product viscosity.

EXAMPLE 49

Add 50% acrylamide aqueous solution 168.937 g, 99% acrylic acid 4.551 g, 34% sodium acrylate 28.838 g, 99% 2-acrylamido 2-mehyl 1-propane sulfonic acid(AMPS) 152.749 g, 15% poly-sodium acrylate 116.667 g, POIZ 530 (Kao Corporation) 17.5 g, Ramigen ET-20(Daiichi kogyo seiyaku) 4.0 g, ammonium sulfate 145.887 g, deionized water 259.259 g into the reactor same as Example 1, while agitating purge nitrogen during 20 minutes and set temperature of reactor at 25° C.

The polymerization reaction was initiated by adding 1.5 g of 2% ammonium persulfate aqueous solution as polymerization initiator. After 4 hours same amount of 2% ammonium persulfate aqueous solution was added. And after 12 hours when its polymerization was completed, 101.613 g of ammonium sulfate was added.

The water soluble anionic polymer dispersion manufactured as written above has 25% of active content, 43 mol % of anionic density, 12 μm of average particle size, 125 cps of product viscosity.

EXAMPLE 50

Add 50% acrylamide aqueous solution 191.633 g, 34% sodium acrylate 135.609 g, 99% 2-acrylamido 2-mehyl 1-propane sulfonic acid(AMPS) 76.959 g, 99% itaconic acid 32.209 g, 15% poly-acrylic acid 100 g, POIZ 520(Kao Corporation) 18.75 g, Noigen ET-89(Daiichi kogyo seiyaku) 5.0 g, ammonium sulfate 156.818 g, deionized water 212.126 g into the reactor same as Example 1, while agitating purge nitrogen during 20 minutes and set temperature of reactor at 25° C.

The polymerization reaction was initiated by adding 1.5 g of 2% sodium bisulfite aqueous solution as polymerization initiator. After 4 hours same amount of 2% sodium bisulfite aqueous solution was added. And after 12 hours when its polymerization was completed, 70.896 g of ammonium sulfate was added.

The water soluble anionic polymer dispersion manufactured as written above has 25% of active content, 45 mol % of anionic density, 9 μm of average particle size, 103 cps of product viscosity.

EXAMPLE 51

Add 50% acrylamide aqueous solution 200.481 g, 99% acrylic acid 14.963 g, 34% sodium acrylate 284.478 g, 99% itaconic acid 38.610 g, 15% poly-AMPS 56.667 g, Cellogen NB-P (Daiichi kogyo seiyaku) 8.75 g, Noigen EA-141(Daiichi kogyo seiyaku) 3.75 g, ammonium sulfate 165.789 g, deionized water 179.982 g into the reactor same as Example 1, while agitating purge nitrogen during 20 minutes and set temperature of reactor at 30° C.

The polymerization reaction was initiated by adding 1.5 g of 2% potassium persulfate aqueous solution as polymerization initiator. After 4 hours same amount of 2% potassium persulfate aqueous solution was added. And after 12 hours when its polymerization was completed, 46.531 g of ammonium sulfate was added.

The water soluble anionic polymer dispersion manufactured as written above has 25% of active content, 52 mol % of anionic density, 13 μm of average particle size, 108 cps of product viscosity.

EXAMPLE 52

Add 50% acrylamide aqueous solution 151.261 g, 99% acrylic acid 19.354 g, 34% sodium acrylate 294.359 g, 99% 2-acrylamido 2-mehyl 1-propane sulfonic acid(AMPS) 55.684 g, 15% poly-acrylic acid 83.333 g, Cellogen 5A((Daiichi kogyo seiyaku) 5.0 g, Noigen EA-135(Daiichi kogyo seiyaku) 5.0 g, ammonium sulfate 172.5 g, deionized water 153.509 g into the reactor same as Example 1, while agitating purge nitrogen during 20 minutes and set temperature of reactor at 35° C.

The polymerization reaction was initiated by adding 1.5 g of 2% potassium persulfate aqueous solution as polymerization initiator. After 4 hours same amount of 2% potassium persulfate aqueous solution was added. And after 12 hours when its polymerization was completed, 60.000 g of ammonium sulfate was added.

The water soluble anionic polymer dispersion manufactured as written above has 25% of active content, 60 mol % of anionic density, 15 μm of average particle size, 148 cps of product viscosity.

EXAMPLE 53

Add 50% acrylamide aqueous solution 345.334 g, 34% sodium acrylate 59.736 g, 99% itaconic acid 7.094 g, 15% poly-acrylic acid 26.667 g, 15% poly-sodium acrylate 26.667 g, Cellogen 5A((Daiichi kogyo seiyaku) 6.0 g, Solsperse 24000(Avecia) 3.0 g, glycerin 4.0 g, ammonium sulfate 173.053 g, deionized water 269.503 g into the reactor same as Example 1, while agitating purge nitrogen during 20 minutes and set temperature of reactor at 25° C.

The polymerization reaction was initiated by adding 1.0 g of 2% potassium persulfate aqueous solution as polymerization initiator. After 4 hours same amount of 2% potassium persulfate aqueous solution was added. And after 12 hours when its polymerization was completed, 78.947 g of ammonium sulfate was added.

The water soluble anionic polymer dispersion manufactured as written above has 20% of active content, 10 mol % of anionic density, 4 μm of average particle size, 132 cps of product viscosity.

EXAMPLE 54

Add 50% acrylamide aqueous solution 276.659 g, 34% sodium acrylate 65.657 g, 99% 2-acrylamido 2-mehyl 1-propane sulfonic acid(AMPS) 39.745 g, 15% poly-sodium acrylate 26.667 g, 15% poly-AMPS 26.667 g, Cellogen NB-P (Daiichi kogyo seiyaku) 2.0 g, Solsperse 20000(Avecia) 2.0 g, glycerin 8.0 g, ammonium sulfate 174.484 g, deionized water 320.607 g into the reactor same as Example 1, while agitating purge nitrogen during 20 minutes and set temperature of reactor at 25° C.

The polymerization reaction was initiated by adding 1.0 g of 2% potassium persulfate aqueous solution as polymerization initiator. After 4 hours same amount of 2% potassium persulfate aqueous solution was added. And after 12 hours when its polymerization was completed, 57.516 g of ammonium sulfate was added.

The water soluble anionic polymer dispersion manufactured as written above has 20% of active content, 18 mol % of anionic density, 3 μm of average particle size, 95 cps of product viscosity.

EXAMPLE 55

Add 50% acrylamide aqueous solution 281.603 g, 99% acrylic acid 9.608 g, 34% sodium acrylate 146.135 g, 15% poly-acrylic acid 26.667 g, 15% poly-AMPS 26.667 g, POIZ 520(Kao Corporation) 10.0 g, Solsperse 44000(Avecia) 8.0 g, glycerin 10.0 g, ammonium sulfate 185.616 g, deionized water 253.320 g into the reactor same as Example 1, while agitating purge nitrogen during 20 minutes and set temperature of reactor at 25° C.

The polymerization reaction was initiated by adding 1.0 g of 2% potassium persulfate aqueous solution as polymerization initiator. After 4 hours same amount of 2% potassium persulfate aqueous solution was added. And after 12 hours when its polymerization was completed, 42.384 g of ammonium sulfate was added.

The water soluble anionic polymer dispersion manufactured as written above has 20% of active content, 25 mol % of anionic density, 5 μm of average particle size, 68 cps of product viscosity.

EXAMPLE 56

Add 50% acrylamide aqueous solution 194.687 g, 99% acrylic acid 4.152 g, 99% 2-acrylamido 2-mehyl 1-propane sulfonic acid(AMPS) 99.542 g, 15% poly-acrylic acid 26.667 g, 15% poly-sodium acrylate 26.667 g, 15% p-AMPS 26.667 g, POIZ 521(Kao Corporation) 15.0 g, Solsperse 43000(Avecia) 8.0 g, glycerin 8.0 g, ammonium sulfate 162.494 g, deionized water 334.620 g into the reactor same as Example 1, while agitating purge nitrogen during 20 minutes and set temperature of reactor at 25° C.

The polymerization reaction was initiated by adding 1.0 g of 2% sodium bisulfite aqueous solution as polymerization initiator. After 4 hours same amount of 2% sodium bisulfite aqueous solution was added. And after 12 hours when its polymerization was completed, 93.506 g of ammonium sulfate was added.

The water soluble anionic polymer dispersion manufactured as written above has 20% of active content, 28 mol % of anionic density, 4 μm of average particle size, 115 cps of product viscosity.

EXAMPLE 57

Add 50% acrylamide aqueous solution 246.498 g, 34% sodium acrylate 225.738 g, 15% poly-sodium acrylate 66.667 g, POIZ 530(Kao Corporation) 15.0 g, glycerin 10.0 g, ammonium sulfate 186.667 g, deionized water 196.097 g into the reactor same as Example 1, while agitating purge nitrogen during 20 minutes and set temperature of reactor at 25° C.

The polymerization reaction was initiated by adding 1.0 g of 2% sodium bisulfite aqueous solution as polymerization initiator. After 4 hours same amount of 2% sodium bisulfite aqueous solution was added. And after 12 hours when its polymerization was completed, 53.333 g of ammonium sulfate was added.

The water soluble anionic polymer dispersion manufactured as written above has 20% of active content, 32 mol % of anionic density, 6 μm of average particle size, 107 cps of product viscosity.

EXAMPLE 58

Add 50% acrylamide aqueous solution 179.205 g, 34% sodium acrylate 116.246 g, 99% 2-acrylamido 2-mehyl 1-propane sulfonic acid(AMPS) 43.980 g, 99% itaconic acid 27.610 g, 15% poly-acrylic acid 53.333 g, POIZ 532A(Kao Corporation) 17.5 g, glycerin 10.0 g, ammonium sulfate 193.252 g, deionized water 288.126 g into the reactor same as Example 1, while agitating purge nitrogen during 20 minutes and set temperature of reactor at 25° C.

The polymerization reaction was initiated by adding 1.0 g of 2% sodium bisulfite aqueous solution as polymerization initiator. After 4 hours same amount of 2% sodium bisulfite aqueous solution was added. And after 12 hours when its polymerization was completed, 70.748 g of ammonium sulfate was added.

The water soluble anionic polymer dispersion manufactured as written above has 20% of active content, 40 mol % of anionic density, 10 μm of average particle size, 94 cps of product viscosity.

EXAMPLE 59

Add 50% acrylamide aqueous solution 194.939 g, 34% sodium acrylate 54.420 g, 99% itaconic acid 49.146 g, 15% poly-acrylic acid 53.333 g, CA-100(Miyoshi) 20.0 g, glycerin 8.0 g, ammonium sulfate 178.105 g, deionized water 384.162 g into the reactor same as Example 1, while agitating purge nitrogen during 20 minutes and set temperature of reactor at 35° C.

The polymerization reaction was initiated by adding 1.0 g of 2% VA-044 aqueous solution as polymerization initiator. After 6 hours same amount of 2% VA-044 aqueous solution was added. And after 12 hours when its polymerization was completed, 57.895 g of ammonium sulfate was added.

The water soluble anionic polymer dispersion manufactured as written above has 20% of active content, 45 mol % of anionic density, 9 μm of average particle size, 36 cps of product viscosity.

EXAMPLE 60

Add 50% acrylamide aqueous solution 101.718 g, 99% 2-acrylamido 2-mehyl 1-propane sulfonic acid(AMPS) 131.058 g, 99% itaconic acid 19.589 g, 15% poly-sodium acrylate 53.333 g, Noigen ET-135(Daiichi kogyo seiyaku) 4.0 g, glycerin 6.0 g, ammonium sulfate 208.444 g, deionized water 420.301 g into the reactor same as Example 1, while agitating purge nitrogen during 20 minutes and set temperature of reactor at 35° C.

The polymerization reaction was initiated by adding 1.0 g of 2% VA-044 aqueous solution as polymerization initiator. After 6 hours same amount of 2% VA-044 aqueous solution was added. And after 12 hours when its polymerization was completed. 55.556 g of ammonium sulfate was added.

The water soluble anionic polymer dispersion manufactured as written above has 20% of active content, 45 mol % of anionic density, 7 μm of average particle size, 57 cps of product viscosity.

EXAMPLE 61

Add 50% acrylamide aqueous solution 159.307 g, 99% acrylic acid 72.474 g, 99% itaconic acid 49.088 g, 15% poly-acrylic acid 40.000 g, Solsperse 27000(Avecia) 3.0 g, glycerin 8.0 g, ammonium sulfate 156.821 g, deionized water 424.131 g into the reactor same as Example 1, while agitating purge nitrogen during 20 minutes and set temperature of reactor at 35° C.

The polymerization reaction was initiated by adding 1.0 g of 2% potassium persulfate aqueous solution as polymerization initiator. After 4 hours same amount of 2% potassium persulfate aqueous solution was added. And after 12 hours when its polymerization was completed, 87.179 g of ammonium sulfate was added.

The water soluble anionic polymer dispersion manufactured as written above has 20% of active content, 55 mol % of anionic density, 8 μm of average particle size, 43 cps of product viscosity.

EXAMPLE 62

Add 50% acrylamide aqueous solution 118.238 g. 34% sodium acrylate 287.617 g, 99% 2-acrylamido 2-mehyl 1-propane sulfonic acid(AMPS) 43.527 g, 15% poly-AMPS 46.667 g, Emarujet 16 (Daiichi kogyo seiyaku) 5.714 g, glycerin 10.0 g, ammonium sulfate 159.077 g, deionized water 252.238 g into the reactor same as Example 1, while agitating purge nitrogen during 20 minutes and set temperature of reactor at 35° C.

The polymerization reaction was initiated by adding 1.0 g of 2% potassium persulfate aqueous solution as polymerization initiator. After 4 hours same amount of 2% potassium persulfate aqueous solution was added. And after 12 hours when its polymerization was completed, 76.923 g of ammonium sulfate was added.

The water soluble anionic polymer dispersion manufactured as written above has 20% of active content, 60 mol % of anionic density, 3 μm of average particle size, 77 cps of product viscosity.

COMPARISON EXAMPLE 1

Add 50% acrylamide aqueous solution 171.157 g, 99% 2-acrylamido 2-mehyl 1-propane sulfonic acid(AMPS) 54.930 g, 99% itaconic acid 10.142 g, 15% poly-sodium acrylate 48.0 g, glycerin 5.685 g, ammonium sulfate 220.068 g, deionized water 455.086 g into the reactor same as Example 1, while agitating purge nitrogen during 20 minutes and set temperature of reactor at 25° C.

The polymerization reaction was initiated by adding 1.5 g of 2% potassium persulfate aqueous solution as polymerization initiator; polymerization reaction was interrupted due to rapid increase in viscosity of reactant after 30 minutes.

COMPARISON EXAMPLE 2

Add 50% acrylamide aqueous solution 230.476 g, 34% sodium acrylate 52.766 g, 99% 2-acrylamido 2-mehyl 1-propane sulfonic acid(AMPS) 11.978 g. 99% itaconic acid 5.013 g, 15% poly-sodium acrylate 45.0 g, glycerin 4.5 g, ammonium sulfate 247.714 g, deionized water 378.641 g into the reactor same as Example 1, while agitating purge nitrogen during 20 minutes and set temperature of reactor at 25° C.

The polymerization reaction was initiated by adding 1.5 g of 2% sodium bisulfite aqueous solution as polymerization initiator; polymerization reaction was interrupted due to rapid increase in viscosity of reactant after 30 minutes.

COMPARISON EXAMPLE 3

Add 50% acrylamide aqueous solution 246.250 g, 99% acrylic acid 7.002 g, 99% 2-acrylamido 2-mehyl 1-propane sulfonic acid(AMPS) 20.145 g, 15% poly-acrylic acid 50.0 g, glycerin 4.5 g, ammonium sulfate 241.858 g, deionized water 400.104 g into the reactor same as Example 1, while agitating purge nitrogen during 20 minutes and set temperature of reactor at 30° C.

The polymerization reaction was initiated by adding 1.5 g of 2% potassium persulfate aqueous solution as polymerization initiator; polymerization reaction was interrupted due to rapid increase in viscosity of reactant after 30 minutes.

This invention is unbounded to preceding embodiments and it is clear to enforce possibilities of many transformations within technical phenomena by person who has ordinary knowledge in the field.

Effect of Invention

The water soluble anionic polymer dispersing liquid and its manufacturing process followed by this invention mentioned above has effects as follows.

The manufacturing process of water soluble anionic polymer dispersing liquid from this invention is extremely effective to control formation speed of nucleus, reaction speed of polymerization and improve electronic stability of the particle created by using anionic surfactant and/or non-ionic surfactant when copolymerizing water soluble anionic monomer and non-ionic monomer in salt water.

Especially the manufacturing process of water soluble anionic polymer dispersing liquid from this invention is distinctively effective to restrain the viscosity increase of reactant during polymerization by using non-ionic surfactant and/or anionic surfactant when copolymerizing water soluble anionic monomer and non-ionic monomer under existence of anionic polymer dispersant.

Also, the water soluble anionic polymer dispersing liquid—manufactured by using non-ionic surfactant of this invention—is highly concentrated, oil-free, high-fluidity, high molecular weight water soluble anionic polymer dispersing liquid with small and uniform particles.

Also, the water soluble anionic polymer dispersing liquid—manufactured by using anionic surfactant of this invention—is highly concentrated, oil-free, high-fluidity, high molecular weight water soluble anionic polymer dispersing liquid with small and uniform particles.

Also, the water soluble anionic polymer dispersing liquid—manufactured by using anionic and non-ionic surfactant of this invention—is highly concentrated, oil-free, high-fluidity, high molecular weight water soluble anionic polymer dispersing liquid with small and uniform particles.

The water soluble anionic polymer dispersing liquid is pH 5-8.5 and 15-300 cps viscosity.

The water soluble anionic polymer dispersing liquid is effective concentration 5-35 weight %, 500 million-2 billion molecular weight, 1-55 μm average particle dimension.

The invention claimed is:

1. A water soluble anionic polymer dispersion, comprising:
a radical copolymer created in salt water which includes anionic monomer, non-ionic monomer, ionic dispersant, radical polymerization initiator, and anionic surfactant or non-ionic surfactant;
wherein the anionic monomer is more than one selected from the group consisting of (meta)acrylic acid, 2-acrylamide-2-methylpropane sulfonic acid, itaconic acid, maleic acid, fumaric acid, vinyl sulfonic acid, and styrenesulfonic acid, or its salt;
wherein the non-ionic monomer is more than one selected from the group consisting of (meta)acryl amide, N,N-dimethylacrylamide, N-isopropylacrylamide, N-butylacrylamide and N-methylacrylamide;
wherein the anionic surfactant, if present, is more than one selected from the group consisting of polycarboxylic acid or its salt, carboxymethyl cellulose sodium salt, carboxymethyl cellulose ammonium salt, and sodium alginate; and
the non-ionic surfactant, if present, is more than one selected from the group consisting of polyoxyethyleneglycolether, polyoxyethylene, polyoxypropyleneglycolether, polyoxyethylene-alkylphenyl-ether, polyoxyethylenealkylether, naphthylpolyoxyethyleneether, and polyoxyethylene-lanolinalcoholether;
wherein the water soluble anionic polymer dispersion has a pH of 5-8.5 before polymerization when all ingredients are mixed and does not include a cationic monomer.

2. A water soluble anionic polymer dispersion, comprising:
a radical copolymer created in salt water which includes anionic monomer, non-ionic monomer, ionic dispersant, radical polymerization initiator, anionic surfactant, and non-ionic surfactant;
wherein the anionic monomer is more than one selected from the group consisting of (meta)acrylic acid, 2-acrylamide-2-methylpropane sulfonic acid, itaconic acid, maleic acid, fumaric acid, vinyl sulfonic acid, and styrenesulfonic acid, or its salt;
wherein the non-ionic monomer is more than one selected from the group consisting of (meta)acryl amide, N,N-dimethylacrylamide, N-isopropylacrylamide, N-butylacrylamide and N-methylacrylamide;
wherein the anionic surfactant is more than one selected from the group consisting of polycarboxylic acid or its salt, carboxymethyl cellulose sodium salt, carboxymethyl cellulose ammonium salt, and sodium alginate; and
the non-ionic surfactant is more than one selected from the group consisting of polyoxyethyleneglycolether, polyoxyethylene, polyoxypropyleneglycolether, polyoxyethylene-alkylphenyl-ether, polyoxyethylenealkylether, naphthylpolyoxyethyleneether, and polyoxyethylene-lanolinalcoholether;
wherein the water soluble anionic polymer dispersion has a pH of 5-8.5 before polymerization when all ingredients are mixed and does not include a cationic monomer.

3. The water soluble anionic polymer dispersion of claim 1 or 2, wherein the anionic surfactant is present in an amount of 0.1-10 parts by weight per 100 parts by weight of monomer.

4. The water soluble anionic polymer dispersion of claim 1 or 2, wherein the non-ionic surfactant is present in an amount of 0.15 parts by weight per 100 parts by weight of monomer.

5. The water soluble anionic polymer dispersion of claim 1 or 2, wherein the ionic dispersant is more than one selected from the group consisting of homo polymer or copolymer of acrylic acid, sodium acrylate, methacrylic acid, sodium methacrylate, and 2-acrylamide 2-methylpropane sulfonic acid.

6. The water soluble anionic polymer dispersion of claim 1 or 2, wherein the ionic dispersant is present in an amount of 0.1-10 parts by weight per 100 parts by weight of monomer.

7. The water soluble anionic polymer dispersion of claim 1 or 2, wherein the salt is more than one selected from the group consisting of ammonium sulfate, sodium sulfate, ammonium chloride, and sodium chloride.

8. The water soluble anionic polymer dispersion of claim 1 or 2, wherein the radical polymerization initiator is more than one selected from the group consisting of potassium persulfate, sodium persulfate, hydrogen peroxide, sodium sulfite, sodium hydrogensulfite, sodium thiosulfate, triethanolamine, N,N,N',N'-tetramethylethylenediamine, 2,2-azovis[2(5-methyl-2-imidazorine-2-yle)2 hydride chloride, 2,2'-azovis(2-amidinopropane)dihydrochloride, and 4,4-azovis(4-methoxy-2,4-dimethyl)valeronitrile.

9. The water soluble anionic polymer dispersion of claim 1 or 2, wherein the radical initiator is present in an amount of 50-2,000 ppm over the total parts by weight of monomer.

10. The water soluble anionic polymer dispersion of claim 1 or 2, wherein the water soluble anionic polymer dispersion has characteristics of 5-35 weight % of active content, and 15-300 cps of product viscosity.

11. The water soluble anionic polymer dispersion of claim 1 or 2, wherein the water soluble anionic polymer dispersion has an average particle size of 1-50 um.

12. The water soluble anionic polymer dispersion of claim 2, wherein the anionic surfactant is present in an amount of 0.1-10 parts by weight per 100 parts by weight of monomer and the non-ionic surfactant is present in an amount of 0.15 parts by weight per 100 parts by weight of monomer.

13. A water soluble anionic polymer dispersion prepared by a process comprising the step of:
copolymerizing anionic monomer and non-ionic monomer in salt water with ionic dispersant, radical polymerization initiator, and anionic surfactant or non-ionic surfactant;
wherein the anionic monomer is more than one selected from the group consisting of (meta)acrylic acid, 2-acrylamide-2-methylpropane sulfonic acid, itaconic acid, maleic acid, fumaric acid, vinyl sulfonic acid, and styrenesulfonic acid, or its salt;
wherein the non-ionic monomer is more than one selected from the group consisting of (meta)acryl amide, N,N-dimethylacrylamide, N-isopropylacrylamide, N-butylacrylamide and N-methylacrylamide;
wherein the anionic surfactant, if present, is more than one selected from the group consisting of polycarboxylic acid or its salt, carboxymethyl cellulose sodium salt, carboxymethyl cellulose ammonium salt, and sodium alginate; and
the non-ionic surfactant, if present, is more than one selected from the group consisting of polyoxyethyleneglycolether, polyoxyethylene, polyoxypropyleneglycolether, polyoxyethylene-alkylphenyl-ether, polyoxyethylenealkylether, naphthylpolyoxyethyleneether, and polyoxyethylene-lanolinalcoholether;
wherein the water soluble anionic polymer dispersion has a pH of 5-8.5 before polymerization when all ingredients are mixed and does not include a cationic monomer.

14. A water soluble anionic polymer dispersion prepared by a process comprising the step of:
copolymerizing anionic monomer and non-ionic monomer in salt water with ionic dispersant, radical polymerization initiator, anionic surfactant, and non-ionic surfactant;
wherein the anionic monomer is more than one selected from the group consisting of (meta)acrylic acid, 2-acrylamide-2-methylpropane sulfonic acid, itaconic acid, maleic acid, fumaric acid, vinyl sulfonic acid, and styrenesulfonic acid, or its salt;
wherein the non-ionic monomer is more than one selected from the group consisting of (meta)acryl amide, N,N-dimethylacrylamide, N-isopropylacrylamide, N-butylacrylamide and N-methylacrylamide;
wherein the anionic surfactant is more than one selected from the group consisting of polycarboxylic acid or its salt, carboxymethyl cellulose sodium salt, carboxymethyl cellulose ammonium salt, and sodium alginate; and
the non-ionic surfactant is more than one selected from the group consisting of polyoxyethyleneglycolether, polyoxyethylene, polyoxypropyleneglycolether, polyoxyethylene-alkylphenyl-ether, polyoxyethylenealkylether, naphthylpolyoxyethyleneether, and polyoxyethylene-lanolinalcoholether;
wherein the water soluble anionic polymer dispersion has a pH of 5-8.5 before polymerization when all ingredients are mixed and does not include a cationic monomer.

* * * * *